(12) United States Patent　(10) Patent No.:　US 12,609,650 B2
Cao et al.　(45) Date of Patent:　Apr. 21, 2026

(54) POWER CONVERTER BOX AND PHOTOVOLTAIC SYSTEM

(71) Applicant: Huawei Digital Power Technologies Co., Ltd., Shenzhen (CN)

(72) Inventors: Zhen Cao, Shanghai (CN); Dong Chen, Shanghai (CN); Xiaofeng Yao, Shenzhen (CN); Jiebin Cheng, Dongguan (CN); Guilei Gu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 18/496,226

(22) Filed: Oct. 27, 2023

(65) Prior Publication Data

US 2024/0063754 A1　Feb. 22, 2024

Related U.S. Application Data

(63) Continuation of application No. PCT/CN2021/091739, filed on Apr. 30, 2021.

(51) Int. Cl.
　*H02S 40/32*　(2014.01)
　*H02S 40/20*　(2014.01)
　　(Continued)

(52) U.S. Cl.
　CPC .............. *H02S 40/32* (2014.12); *H02S 40/20* (2014.12); *H02S 40/34* (2014.12); *H02S 50/10* (2014.12)

(58) Field of Classification Search
　CPC .................................. H02S 40/32; H02S 40/34
　See application file for complete search history.

(56) References Cited

U.S. PATENT DOCUMENTS

2009/0160259 A1*　6/2009　Naiknaware ........ H02M 7/4807
　　　　　　　307/82
2011/0006609 A1　1/2011　Loh et al.
　　　　(Continued)

FOREIGN PATENT DOCUMENTS

CN　　104362971 A　　2/2015
CN　　104485634 A　　4/2015
　　　　(Continued)

*Primary Examiner* — Sadie White
(74) *Attorney, Agent, or Firm* — Conley Rose, P.C.

(57)　　　　　　ABSTRACT

A power converter box includes at least two power converters, and the at least two power converters include one primary power converter and at least one secondary power converter. The primary power converter obtains status information of a photovoltaic substring corresponding to a secondary power converter, and sends, to an inverter by using a power-line carrier (PLC) communication module in the primary power converter, the status information of the photovoltaic substring corresponding to the secondary power converter and status information of a photovoltaic substring corresponding to the primary power converter. The primary power converter further receives, by using the PLC communication module in the primary power converter, control information sent by the inverter, controls, based on the control information, an output power of the photovoltaic substring corresponding to the primary power converter.

20 Claims, 11 Drawing Sheets

(51) Int. Cl.
    *H02S 40/34*        (2014.01)
    *H02S 50/10*        (2014.01)

(56)              References Cited

U.S. PATENT DOCUMENTS

| | | | | |
|---|---|---|---|---|
| 2011/0245989 | A1* | 10/2011 | Makhota | H02S 40/34 700/297 |
| 2012/0161527 | A1* | 6/2012 | Casey | H02J 7/35 307/80 |
| 2012/0274139 | A1* | 11/2012 | Agamy | H02J 3/381 307/71 |
| 2012/0319489 | A1* | 12/2012 | McCaslin | H02J 3/381 307/77 |
| 2013/0038124 | A1* | 2/2013 | Newdoll | H02J 13/00028 307/31 |
| 2013/0328403 | A1* | 12/2013 | Kaufman | H02J 3/46 307/77 |
| 2014/0055900 | A1* | 2/2014 | Luebke | H02S 40/36 361/93.1 |
| 2016/0344194 | A1 | 11/2016 | Arditi et al. | |
| 2017/0047739 | A1 | 2/2017 | Berger | |
| 2017/0279265 | A1* | 9/2017 | Har-Shai | H02H 7/20 |
| 2017/0288409 | A1* | 10/2017 | Yoscovich | H02S 40/32 |
| 2018/0076732 | A1* | 3/2018 | Yoscovich | H02J 3/38 |
| 2018/0083571 | A1* | 3/2018 | Xu | H02J 3/46 |
| 2018/0233919 | A1* | 8/2018 | Gu | H02S 40/32 |
| 2020/0303949 | A1* | 9/2020 | Pauletti | H10F 19/00 |

FOREIGN PATENT DOCUMENTS

| | | |
|---|---|---|
| CN | 204271895 U | 4/2015 |
| CN | 204349967 U | 5/2015 |
| CN | 105576946 A | 5/2016 |
| CN | 105634461 A | 6/2016 |
| CN | 106094965 A | 11/2016 |
| CN | 205920436 U | 2/2017 |
| CN | 106487422 A | 3/2017 |
| CN | 106817075 A | 6/2017 |
| CN | 108111123 A | 6/2018 |
| CN | 207603436 U | 7/2018 |
| CN | 109245712 A | 1/2019 |
| CN | 109245713 A | 1/2019 |
| CN | 109617565 A | 4/2019 |
| CN | 109765960 A | 5/2019 |
| CN | 209120129 U | 7/2019 |
| CN | 209218080 U | 8/2019 |

\* cited by examiner

POWER CONVERTER BOX AND PHOTOVOLTAIC SYSTEM

CROSS-REFERENCE TO RELATED APPLICATIONS

This is a continuation of International Patent Application No. PCT/CN2021/091739 filed on Apr. 30, 2021, the disclosure of which is hereby incorporated by reference in its entirety.

TECHNICAL FIELD

This application relates to the field of photovoltaic technologies, and in particular, to a power converter box and a photovoltaic system.

BACKGROUND

A junction box is attached to a backplane of a solar panel (namely, a photovoltaic module), a lead-out line in the photovoltaic module is connected to an internal line in the junction box, and the junction box is connected to an external cable, so that electricity generated by the photovoltaic module is connected to the external line. With development of technologies such as module slicing and bifacial modules, a split junction box (especially a tripartite split junction box) that well matches the module slicing technology appears.

To resolve a problem of mismatch with the photovoltaic module, a photovoltaic power converter (which may also be briefly referred to as a power converter) is further disposed on the backplane of the photovoltaic module. Currently, the power converter is placed outside the junction box, and the power converter and the junction box can be connected through the external cable. To save the external cable, the power converter can be integrated into the junction box. However, the split junction box also requires a split power converter, to be specific, at least two power converters exist in one photovoltaic module. For example, if a tripartite split junction box is disposed on the backplane of the photovoltaic module, a quantity of power converters becomes three (that is, a tripartite split power converter is required) after the power converters are integrated into the junction box. In this case, how the photovoltaic module implements functions such as module monitoring, module IV scanning, and module shutdown becomes a key research problem.

In a research and practice process, it is found that power converters disposed on a backplane of a photovoltaic module are independent of each other. A tripartite split power converter shown in FIG. 1 is used as an example. Three power converters separately perform power-line communication with the outside (for example, an inverter). The inverter obtains information about each power converter, and controls the photovoltaic module to implement functions such as module monitoring, module IV scanning, and module shutdown. In other words, each power converter in the conventional technology needs to be equipped with a power-line carrier (PLC) communication module. Preparation costs of the PLC communication module are high.

SUMMARY

Embodiments of this application provide a power converter box and a photovoltaic system, to reduce costs.

According to a first aspect, an embodiment of this application provides a power converter box. The power converter box is applicable to a photovoltaic system including at least two photovoltaic substrings. The power converter box includes at least two power converters. Input ends of the power converters are coupled to output ends of corresponding photovoltaic substrings, output ends of the power converters are coupled in series, and two ends obtained after the output ends of the power converters are coupled in series are coupled to an inverter in the photovoltaic system. The at least two power converters include a primary power converter and at least one secondary power converter. That is, it may be understood that the power converters in this embodiment of this application are classified into two types: primary power converters and secondary power converters, and all power converters other than the primary power converters are secondary power converters. The primary power converter may collect status information of a photovoltaic substring corresponding to the primary power converter, and the secondary power converter may collect status information of a photovoltaic substring corresponding to the secondary power converter, and may further send, to the primary power converter, the status information of the photovoltaic substring corresponding to the secondary power converter. In other words, the primary power converter may obtain the status information of the photovoltaic substring corresponding to the secondary power converter and the status information of the photovoltaic substring corresponding to the primary power converter. The primary power converter may send, to the inverter, the status information of the photovoltaic substring corresponding to the secondary power converter and the status information of the photovoltaic substring corresponding to the primary power converter. In this embodiment of this application, the primary power converter may communicate with each secondary power converter. Each power converter sends, to the primary power converter, status information of a photovoltaic substring corresponding to the power converter, and then the primary power converter sends the status information of all the photovoltaic substrings of the photovoltaic module to the inverter.

With reference to the first aspect, in a first possible implementation, each power converter includes a pulse width modulation module, and the primary power converter communicates with the secondary power converter by using the pulse width modulation module.

With reference to the first possible implementation of the first aspect, in a second possible implementation, the secondary power converter further includes a first switch module. The secondary power converter generates, by using a pulse width modulation module in the secondary power converter, a first pulse width signal based on status information of a photovoltaic substring corresponding to the secondary power converter, and sends the first pulse width signal to the first switch module, to control an output voltage of the first switch module. The output voltage of the first switch module carries the status information of the photovoltaic substring corresponding to the secondary power converter. The primary power converter obtains the status information of the photovoltaic substring corresponding to the secondary power converter by collecting the output voltage of the first switch module in the secondary power converter.

With reference to the first aspect, in a third possible implementation, each power converter includes at least one infrared module, and the primary power converter communicates with the secondary power converter by using the infrared module.

With reference to the first aspect, in a fourth possible implementation, each power converter includes at least one serial communication module. Serial communication modules of the power converters are coupled by using an isolation capacitor, and the primary power converter communicates with the secondary power converter by using the serial communication module.

With reference to the first aspect, in a fifth possible implementation, each power converter includes at least one voltage translation module, and the primary power converter and the secondary power converter perform analog communication by using the voltage translation module.

With reference to the first aspect or any one of the foregoing possible implementations of the first aspect, in a sixth possible implementation, each photovoltaic substring includes two parallel substring units, and parallel connection points between the two parallel substring units are the output ends of the photovoltaic substring in which the two parallel substring units are located. In this embodiment of this application, a photovoltaic substring is divided into two parallel substring units, so that heat generated by the photovoltaic substring can be reduced while a same power output is ensured.

With reference to the first aspect or any one of the foregoing possible implementations of the first aspect, in a seventh possible implementation, each power converter has a positive output end and a negative output end, and the secondary power converter includes a first secondary power converter and a second secondary power converter. A serial coupling of the output ends of the power converters is specifically implemented as follows: A positive output end of the first secondary power converter is coupled to a positive input end of the inverter, a negative output end of the first secondary power converter is coupled to a positive output end of the primary power converter, a negative output end of the primary power converter is coupled to a positive output end of the second secondary power converter, and a negative output end of the second secondary power converter is coupled to a negative input end of the inverter. In other words, the primary power converter is located in the middle of the power converters in the photovoltaic system. In this embodiment of this application, a communication distance between the primary power converter and each secondary power converter can be reduced, thereby improving communication effect.

With reference to the first aspect, in an eighth possible implementation, the primary power converter may receive, by using the PLC communication module, control information sent by an inverter, and control, based on the control information, an output power of a photovoltaic substring corresponding to the primary power converter, where the control information is generated by the inverter based on status information of at least one photovoltaic substring in the photovoltaic module. The primary power converter may further send the control information to a secondary converter, and the secondary power converter may control, based on the control information, an output power of a photovoltaic substring corresponding to the secondary power converter.

According to a second aspect, an embodiment of this application provides a power converter box. The power converter box is applicable to a photovoltaic system including at least two photovoltaic substrings. The power converter box includes at least two power converters. Input ends of the power converters are coupled to output ends of corresponding photovoltaic substrings, output ends of the power converters are coupled in series, and two ends obtained after the output ends of the power converters are coupled in series are coupled to an inverter in the photovoltaic system. The at least two power converters include a primary power converter and at least one secondary power converter. That is, it may be understood that the power converters in this embodiment of this application are classified into two types: primary power converters and secondary power converters, and all power converters other than the primary power converters are secondary power converters. The primary power converter may receive, by using a PLC communication module in the primary power converter, control information sent by the inverter, and control, based on the control information, an output power of a photovoltaic substring corresponding to the primary power converter. The primary power converter may further send the control information to a secondary power converter. The secondary power converter may control, based on the control information, an output power of a photovoltaic substring corresponding to the secondary power converter. In this embodiment of this application, the primary power converter may communicate with each secondary power converter. When the inverter delivers control information to a photovoltaic module, the primary power converter first receives the control information delivered by the inverter, and then the primary power converter sends the control information to each secondary power converter.

With reference to the second aspect, in a first possible implementation, each power converter includes a pulse width modulation module, and the primary power converter communicates with the secondary power converter by using the pulse width modulation module.

With reference to the first possible implementation of the second aspect, in a second possible implementation, the primary power converter further includes a second switch module. The primary power converter generates, by using a pulse width modulation module in the primary power converter, a second pulse width signal based on the control information, and sends the second pulse width signal to the first switch module, to control an output voltage of the second switch module. The output voltage of the second switch module carries the control information. The secondary power converter obtains the control information by collecting the output voltage of the second switch module in the primary power converter.

With reference to the second aspect, in a third possible implementation, each power converter includes at least one infrared module, and the primary power converter communicates with the secondary power converter by using the infrared module.

With reference to the second aspect, in a fourth possible implementation, each power converter includes at least one serial communication module. Serial communication modules of the power converters are coupled through an isolation capacitor, and the primary power converter communicates with the secondary power converter by using the serial communication module.

With reference to the second aspect, in a fifth possible implementation, each power converter includes at least one voltage translation module, and the primary power converter and the secondary power converter perform analog communication by using the voltage translation module.

With reference to the second aspect or any one of the foregoing possible implementations of the second aspect, in a sixth possible implementation, each photovoltaic substring includes two parallel substring units, and parallel connection points between the two parallel substring units are the output ends of the photovoltaic substring in which the two parallel substring units are located.

With reference to the second aspect or any one of the foregoing possible implementations of the second aspect, in a seventh possible implementation, each power converter has a positive output end and a negative output end, and the secondary power converter includes a first secondary power converter and a second secondary power converter. A serial coupling of the output ends of the power converters is specifically implemented as follows: A positive output end of the first secondary power converter is coupled to a positive input end of the inverter, a negative output end of the first secondary power converter is coupled to a positive output end of the primary power converter, a negative output end of the primary power converter is coupled to a positive output end of the second secondary power converter, and a negative output end of the second secondary power converter is coupled to a negative input end of the inverter.

With reference to the second aspect, in an eighth possible implementation, the primary power converter may collect information about a photovoltaic substring corresponding to the primary power converter, and the secondary power converter may collect status information of a photovoltaic substring corresponding to the secondary power converter, and send, to the primary power converter, the status information of the photovoltaic substring corresponding to the secondary power converter. The primary power converter may obtain the status information of the photovoltaic substring corresponding to the secondary power converter, and send, to the inverter by using the PLC communication module, the status information of the photovoltaic substring corresponding to the secondary power converter and the status information of the photovoltaic substring corresponding to the primary power converter.

According to a third aspect, an embodiment of this application provides a photovoltaic system. The photovoltaic system includes at least two photovoltaic substrings, an inverter, and the power converter box with reference to the first aspect or with reference to any one of the possible implementations of the first aspect, and the at least two photovoltaic substrings are located in a same photovoltaic module.

According to a fourth aspect, an embodiment of this application provides a photovoltaic system. The photovoltaic system includes at least two photovoltaic substrings, an inverter, and the power converter box with reference to the second aspect or with reference to any one of the possible implementations of the second aspect, and the at least two photovoltaic substrings are located in a same photovoltaic module.

It should be understood that, for implementations and beneficial effect of the foregoing aspects of this application, reference may be made to each other.

DESCRIPTION OF EMBODIMENTS

The following clearly and describes the technical solutions in embodiments of this application with reference to accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The following further describes in detail embodiments of this application with reference to the accompanying drawings.

Figure 1:
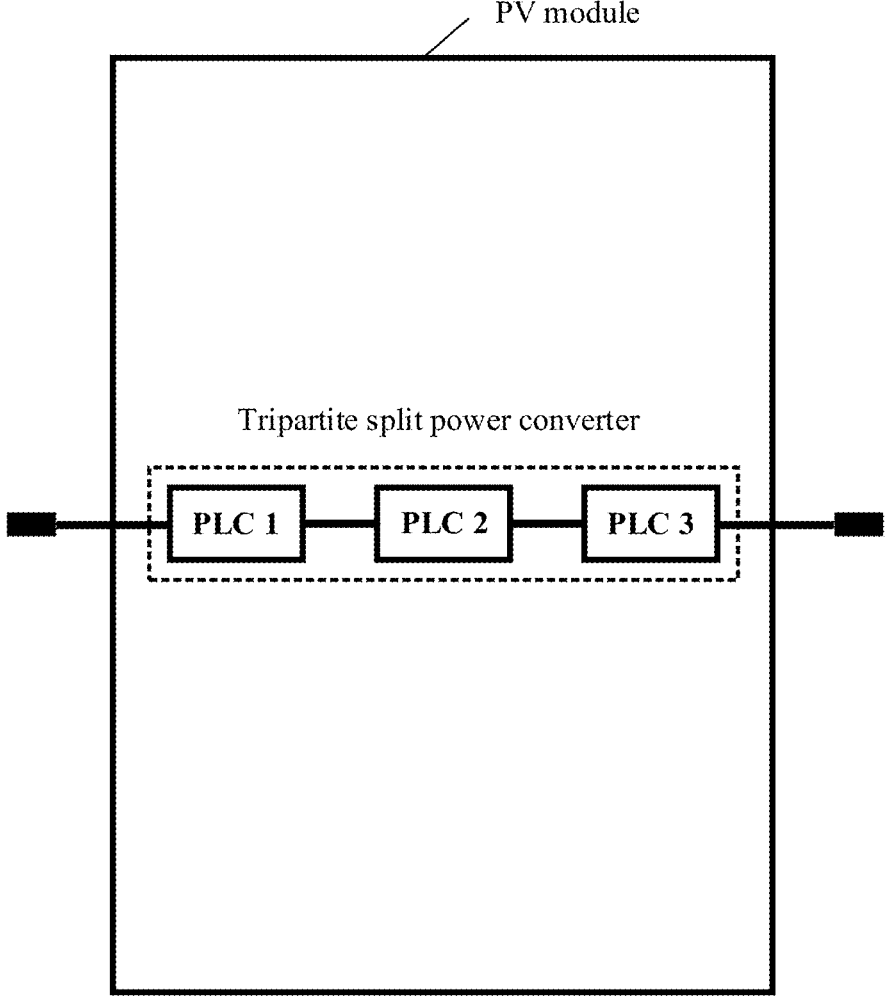
FIG. 1 is a block diagram of a structure of a tripartite split power converter in a conventional technology.
Figure 2:
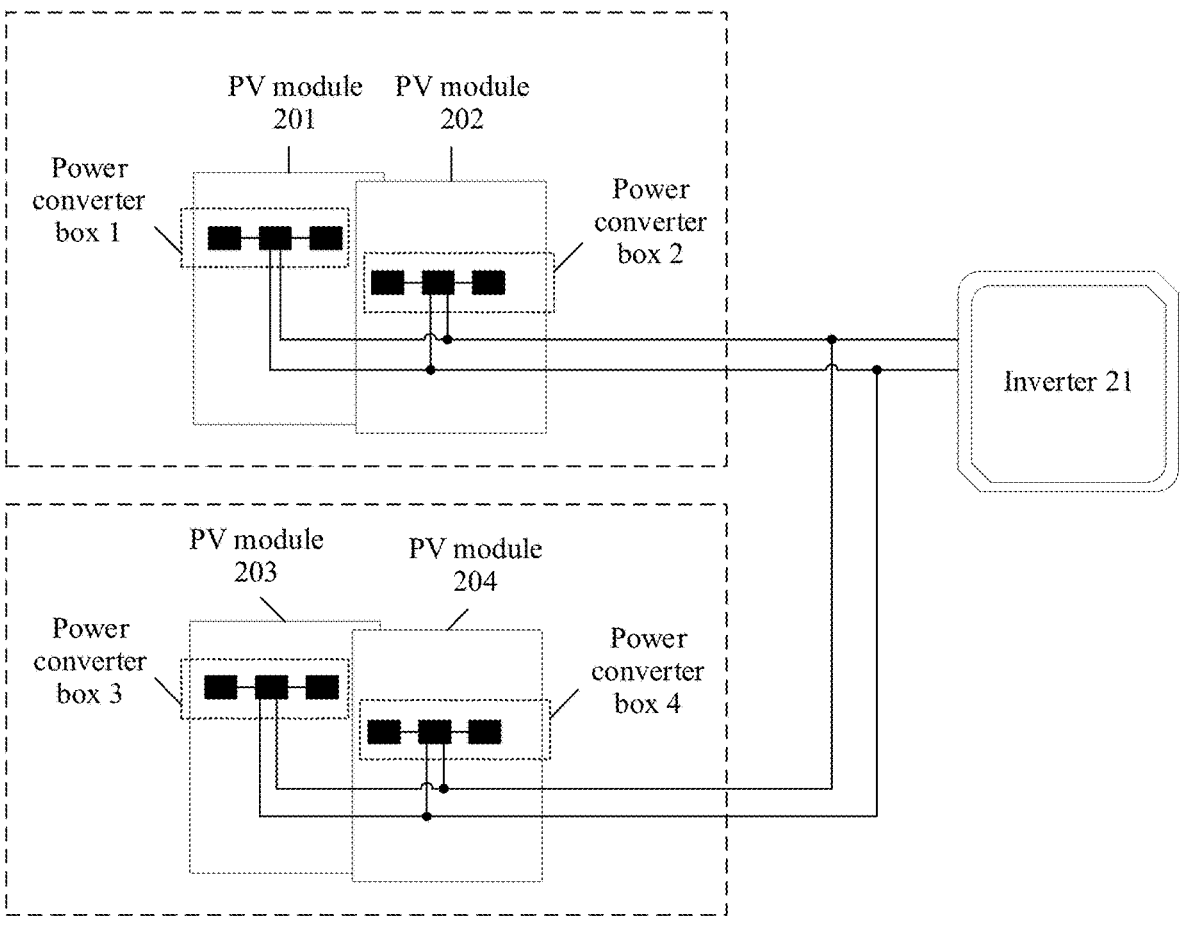
FIG. 2 is a block diagram of a structure of a photovoltaic system according to an embodiment of this application.

Refer to FIG. 2. FIG. 2 is a block diagram of a structure of a photovoltaic system according to an embodiment of this application. As shown in FIG. 2, the photovoltaic system includes at least one photovoltaic module (for example, a photovoltaic module 201, a photovoltaic module 202, a photovoltaic module 203, and a photovoltaic module 204) and an inverter 21. The photovoltaic modules may be connected in series and in parallel to form a photovoltaic module array, to provide a direct current to the inverter 21. The inverter 21 may convert the direct current into an alternating current.

For example, the photovoltaic module 201 and the photovoltaic module 202 are connected in series and coupled to the inverter 21, to output a first direct current to the inverter 21. The photovoltaic module 203 and the photovoltaic module 204 are connected in series and coupled to the inverter 21, to output a second direct current to the inverter 21.

It should be noted that "coupling" described in this application indicates a direct or indirect connection. For example, that A is connected to B may be that A is directly connected to B, or may be that A is indirectly connected to B by using one or more other electrical devices. For example, it may be that A is directly connected to C, and C is directly connected to B, so that A is connected to B by through C.

For example, in some feasible implementations, a switch, a power distribution cabinet, and the like may be disposed between each photovoltaic module and the inverter 21.

In some feasible implementations, a power converter box may be correspondingly disposed for each photovoltaic module. For example, a power converter box 1 is disposed on a backplane of the photovoltaic module 201, a power converter box 2 is disposed on a backplane of the photovoltaic module 202, a power converter box 3 is disposed on a backplane of the photovoltaic module 203, and a power converter box 4 is disposed on a backplane of the photovoltaic module 204. For example, each power converter box may include at least two power converters.

Optionally, in some feasible implementations, power converter boxes may be correspondingly disposed on some photovoltaic modules in the photovoltaic system. For example, the power converter box 1 is disposed on the backplane of the photovoltaic module 201, and no power converter box (not shown in the figure) is disposed on the backplanes of the photovoltaic module 202, the photovoltaic module 203, and the photovoltaic module 204. That is, a quantity of photovoltaic modules provided with power converter boxes in the photovoltaic system is not limited in this embodiment of this application.

In some feasible implementations, the photovoltaic module in this embodiment of this application is a tripartite photovoltaic module, to be specific, each photovoltaic module includes three photovoltaic substrings. For example, output ends of the photovoltaic substrings are one-to-one coupled to input ends of the power converter. For another example, output ends of the plurality of photovoltaic substrings may be coupled to an input end of one power converter, in other words, the plurality of photovoltaic substrings shares one power converter. A quantity of photovoltaic substrings corresponding to the power converter is not limited in this embodiment of this application.

The power converter box in this embodiment of this application may perform maximum power point tracking (MPPT) on the photovoltaic substring in the photovoltaic module. In a specific implementation, the power converter may detect a current voltage output by the photovoltaic substring, and control a maximum output power of the photovoltaic substring by adjusting a duty cycle of a direct-current to direct-current (DC/DC) conversion circuit (for example, a buck circuit, a boost circuit, or a buck-boost circuit) in the power converter.

Optionally, the power converter in this embodiment of this application may not provide the foregoing MPPT function, but provide a shutdown function. When a photovoltaic substring works abnormally, connection between the photovoltaic substring and the photovoltaic system may be interrupted, to prevent the photovoltaic substring from affecting operation of the photovoltaic system. In this case, the power converter may be understood as a disconnector.

It should be noted that the power converter box in this embodiment of this application includes at least two power converters, and the at least two power converters include one primary power converter and at least one secondary power converter.

In this embodiment of this application, the primary power converter may communicate with each secondary power converter. For example, when the inverter delivers control information to a photovoltaic module, a primary power converter first receives the control information delivered by the inverter, and then the primary power converter sends the control information to each secondary power converter. For another example, when each power converter sends status information of a corresponding photovoltaic substring to the inverter, each secondary power converter sends, to the primary power converter, status information of a photovoltaic substring corresponding to the secondary power converter, and then the primary power converter sends status information of all photovoltaic substrings in the photovoltaic module to the inverter. In this embodiment of this application, a secondary power converter neither needs to be equipped with an external communication module, nor needs to be connected to the inverter through communication cables. Only the primary power converter may be equipped with an external communication module, so that preparation costs of a power converter box can be reduced.

The following describes embodiments of this application in detail by using an example in which the power converter box 1 is disposed in the photovoltaic module 201. Refer to FIG. 3 to FIG. 7.

Figure 3:
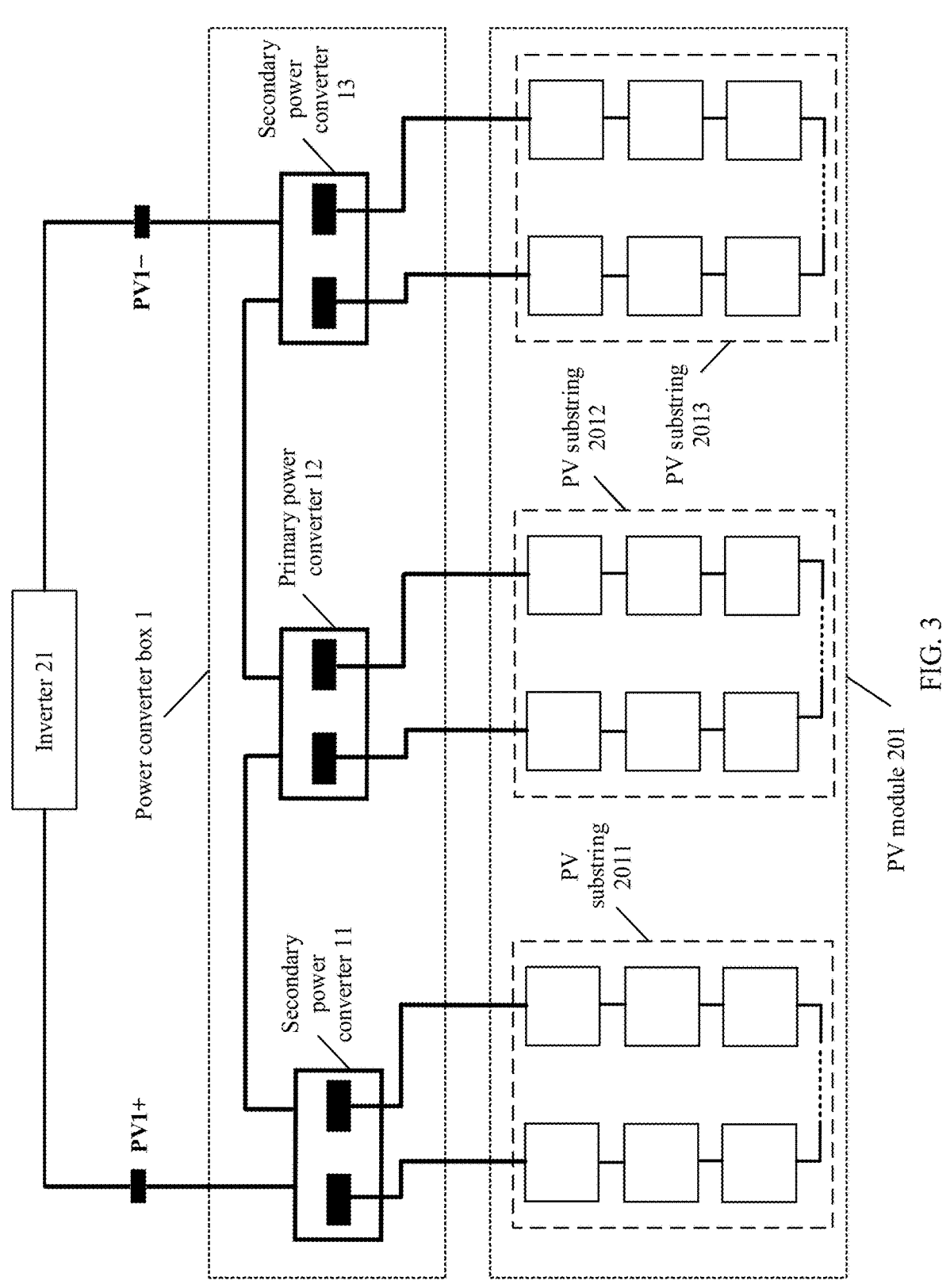
FIG. 3 is a block diagram of a partial structure of a photovoltaic system according to an embodiment of this application.

First refer to FIG. 3. FIG. 3 is a block diagram of a partial structure of a photovoltaic system according to an embodiment of this application. As shown in FIG. 3, the photovoltaic module 201 includes at least two photovoltaic substrings (for example, a photovoltaic substring 2011, a photovoltaic substring 2012, and a photovoltaic substring 2013). The power converter box 1 includes at least two power converters, and the at least two power converters include a primary power converter 12 and at least one secondary power converter (for example, a secondary power converter 11 and a secondary power converter 13).

There is a correspondence between a power converter and at least one photovoltaic substring. In FIG. 3, that one photovoltaic substring corresponds to one power converter is used as an example. For example, the photovoltaic substring 2011 corresponds to the secondary power converter 11, the photovoltaic substring 2012 corresponds to the primary power converter 12, and the photovoltaic substring 2013 corresponds to the secondary power converter 13.

Input ends of each power converter are coupled to output ends of a photovoltaic substring corresponding to the power converter. Each photovoltaic substring has two output ends, and each power converter has two input ends. Specifically, a positive input end of the secondary power converter 11 is coupled to a positive output end of the photovoltaic substring 2011, and a negative input end of the power converter 11 is coupled to a negative output end of the photovoltaic substring 2011. A positive input end of the primary power converter 12 is coupled to a positive output end of the photovoltaic substring 2012, and a negative input end of the primary power converter 12 is coupled to a negative output end of the photovoltaic substring 2012. A positive input end of the secondary power converter 13 is coupled to a positive output end of the photovoltaic substring 2013, and a negative input end of the power converter 13 is coupled to a negative output end of the photovoltaic substring 2013.

Figure 4:
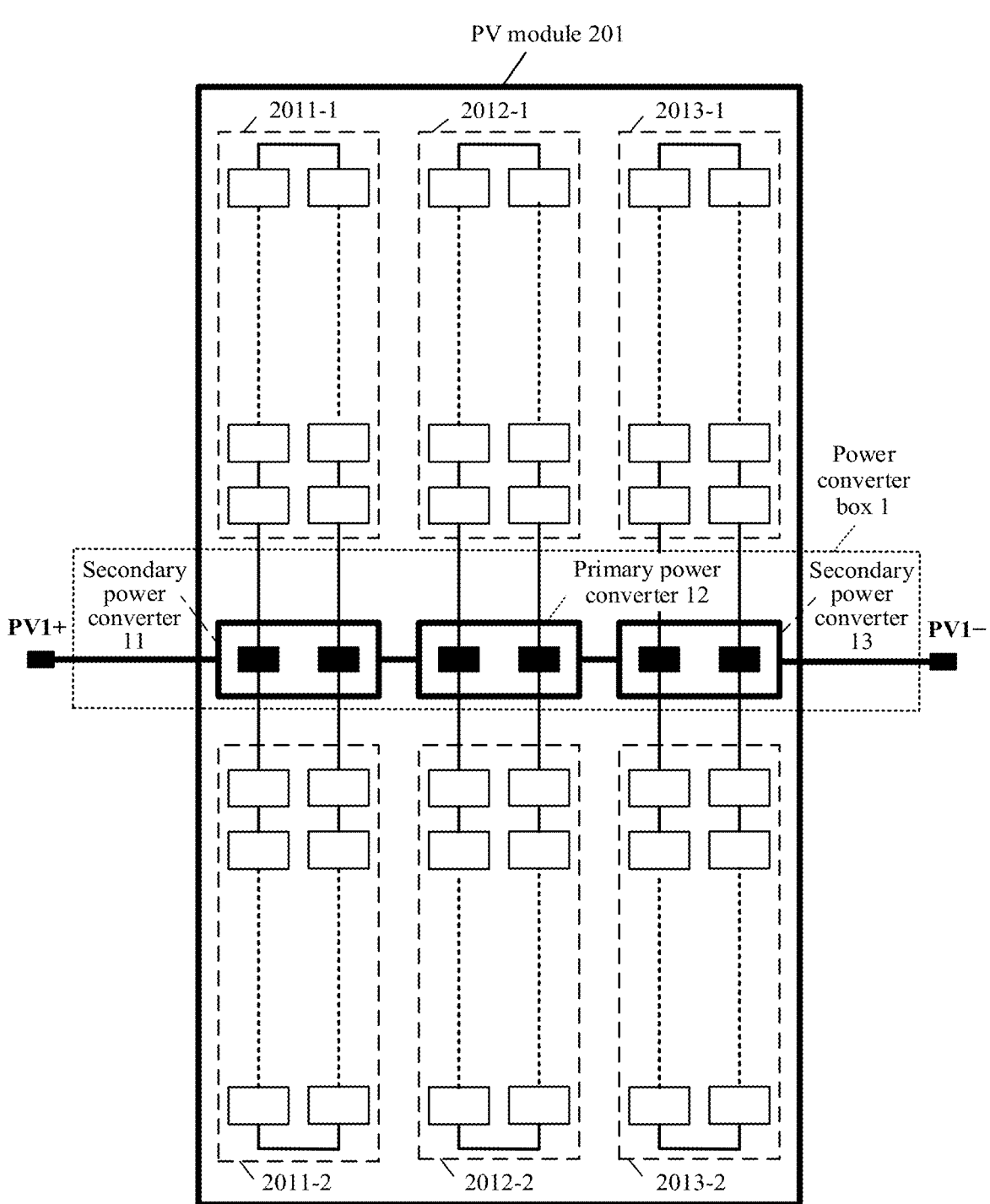
FIG. 4 is a block diagram of another partial structure of a photovoltaic system according to an embodiment of this application.

In some feasible implementations, refer to FIG. 4. FIG. 4 is a block diagram of another partial structure of a photovoltaic system according to an embodiment of this application. As shown in FIG. 4, each photovoltaic substring includes two parallel substring units, and parallel connection points between the two parallel substring units are output ends of a photovoltaic substring in which the two parallel substring units are located. For example, the photovoltaic substring 2011 includes a substring unit 2011-1 and a substring unit 2011-2, and the substring unit 2011-1 and the substring unit 2011-2 are connected in parallel. A positive output end of the substring unit 2011-1 and a positive output end of the substring unit 2011-2 are coupled to a positive input end of the secondary power converter 11, and a negative output end of the substring unit 2011-1 and a negative output end of the substring unit 2011-2 are coupled to a negative input end of the secondary power converter 11.

Similarly, a positive output end of a substring unit 2012-1 and a positive output end of a substring unit 2012-2 are coupled to a positive input end of the primary power converter 12, and a negative output end of the substring unit 2012-1 and a negative output end of the substring unit 2012-2 are coupled to a negative input end of the primary power converter 12. A positive output end of a substring unit 2013-1 and a positive output end of a substring unit 2013-2 are coupled to a positive input end of the secondary power converter 13, and a negative output end of the substring unit 2013-1 and a negative output end of the substring unit 2013-2 are coupled to a negative input end of the secondary power converter 13. In this embodiment of this application, the photovoltaic substring is divided into two parallel substring units, so that heat generated by the photovoltaic substring can be reduced while a same power output is ensured.

Output ends of the power converters are coupled in series, and each power converter has a positive output end and a negative output end. It may be understood that in-series coupling of the power converters is that a negative output end of one power converter is coupled to a positive output end of another power converter. For example, two ends obtained after the output ends of the power converters are coupled in series may be coupled to the inverter 21 in the photovoltaic system. In some feasible implementations, two ends obtained after a plurality of power converters in a plurality of photovoltaic modules are coupled in series may be coupled to the inverter 21 in the photovoltaic system.

In some feasible implementations, an example in which the photovoltaic system includes three power converters is used. To be specific, the photovoltaic system includes the secondary power converter 11 (namely, the first secondary power converter), the primary power converter 12, and the secondary power converter 13 (namely, the second secondary power converter) shown in FIG. 3 and FIG. 4. Specifically, a positive output end of the first secondary power converter is coupled to a positive output terminal PV1+ of the photovoltaic module 201 (namely, a positive input end of the inverter 21), a negative output end of the first secondary power converter is coupled to a positive output end of the primary power converter 12, a negative output end of the primary power converter 12 is coupled to a positive output end of the second secondary power converter, and a negative output end of the second secondary power converter is coupled to a negative output terminal PV1− of the photovoltaic module 201 (that is, coupled to a negative input end of the inverter 21). In other words, the primary power converter 12 is located in the middle of the power converters in the photovoltaic system. In this embodiment of this application, a communication distance between the primary power converter and each secondary power converter can be reduced, thereby improving communication effect.

It should be noted that the primary power converter in this embodiment of this application may also be located on either of two sides of the power converters in the photovoltaic system (not shown in the figure). A location of the primary power converter is not limited in this embodiment of this application.

Figure 5:
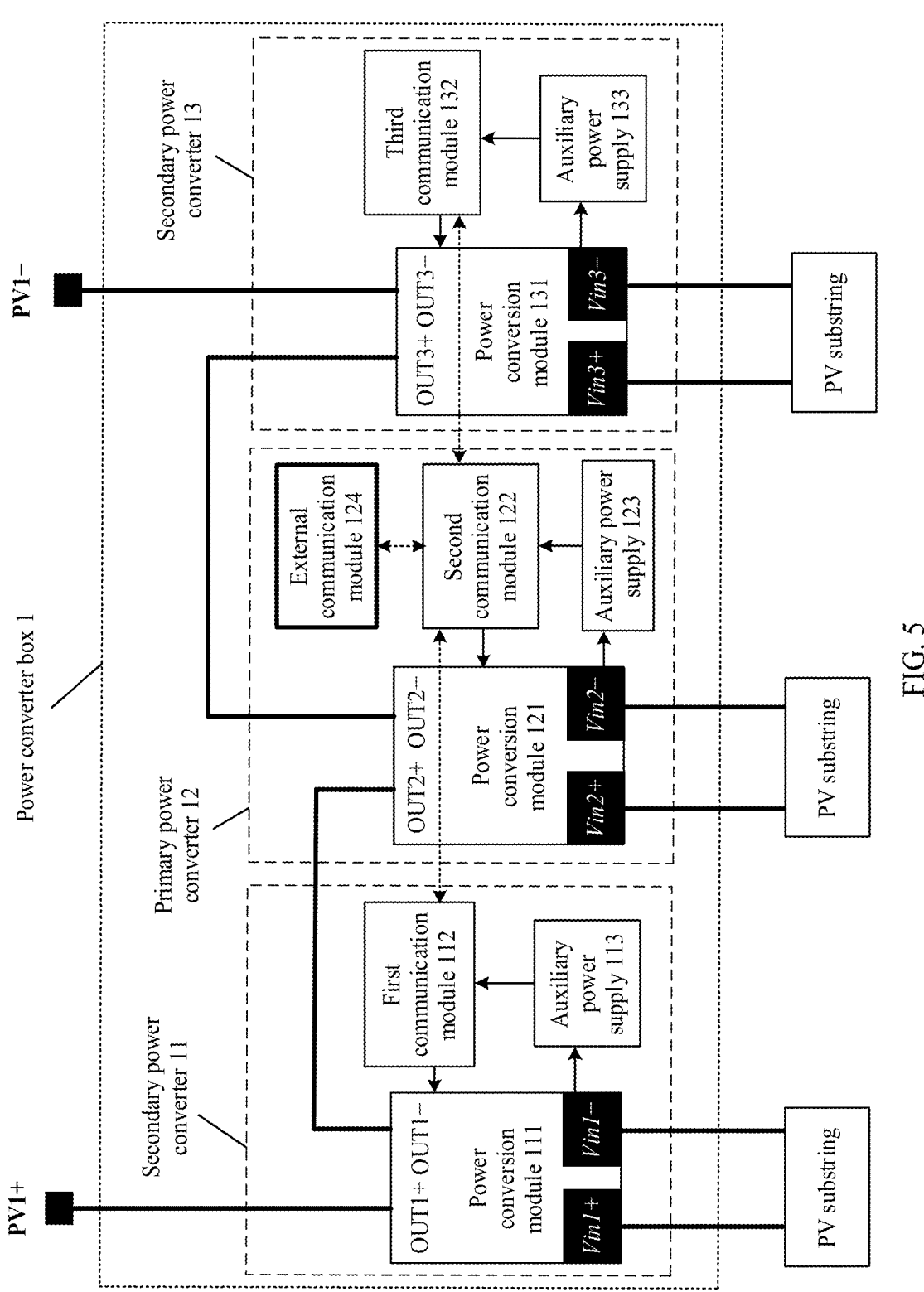
FIG. 5 is a block diagram of a structure of a power converter box according to an embodiment of this application.

Refer to FIG. 5. FIG. 5 is a block diagram of a structure of a power converter box according to an embodiment of this application. As shown in FIG. 5, each power converter has two input ends and two output ends. For example, a positive input end of a secondary power converter 11 is Vin1+, a negative input end of the secondary power converter 11 is Vin1−, a positive output end of the secondary power converter 11 is OUT1+, and a negative output end of the secondary power converter 11 is OUT1−. A positive input end of a primary power converter 12 is Vin2+, a negative input end of the primary power converter 12 is Vin2−, a positive output end of the primary power converter 12 is OUT2+, and a negative output end of the primary power converter 12 is OUT2−. A positive input end of a secondary power converter 13 is Vin3+, a negative input end of the secondary power converter 13 is Vin3−, a positive output end of the secondary power converter 13 is OUT3+, and a negative output end of the secondary power converter 13 is OUT3−.

Each power converter includes a power conversion module and an auxiliary power supply. For example, the secondary power converter 11 includes a power conversion module 111 and an auxiliary power supply 113. The primary power converter 12 includes a power conversion module 121 and an auxiliary power supply 123. The secondary power converter 13 includes a power conversion module 131 and an auxiliary power supply 133.

The power conversion module in each power converter may be a DC/DC conversion circuit, for example, any one of a buck circuit, a boost circuit, or a buck-boost circuit. Power conversion modules in the power converters may have a same structure or different structures. A specific circuit structure of the power conversion module is not limited in this embodiment of this application.

An input of an auxiliary power supply in each power converter is an output of a power conversion module in each power converter. The auxiliary power supply in each power converter is configured to supply power to a communication module in each power converter.

Further, each power converter includes a communication module. For example, the secondary power converter 11 further includes a first communication module 112, the primary power converter 12 further includes a second communication module 122, and the secondary power converter 13 further includes a third communication module 132. In this case, a power supply relationship in the power converters is as follows: The first communication module 112 is powered by the auxiliary power supply 113, and an input power supply of the auxiliary power supply 113 comes from the power conversion module 111. The second communication module 122 is powered by the auxiliary power supply 123, and an input power supply of the auxiliary power supply 123 comes from the power conversion module 121. The third communication module 132 is powered by the auxiliary power supply 133, and an input power supply of the auxiliary power supply 133 comes from the power conversion module 131.

The primary power converter 12 may communicate with each secondary power converter through the second communication module 122. A specific communication manner may include a wireless communication manner such as ZigBee®, Wi-Fi®, Bluetooth®, or infrared. A specific communication manner may further include a wired communication manner such as PLC communication, RS485, or an inter-integrated circuit (IIC) bus.

Figure 6:
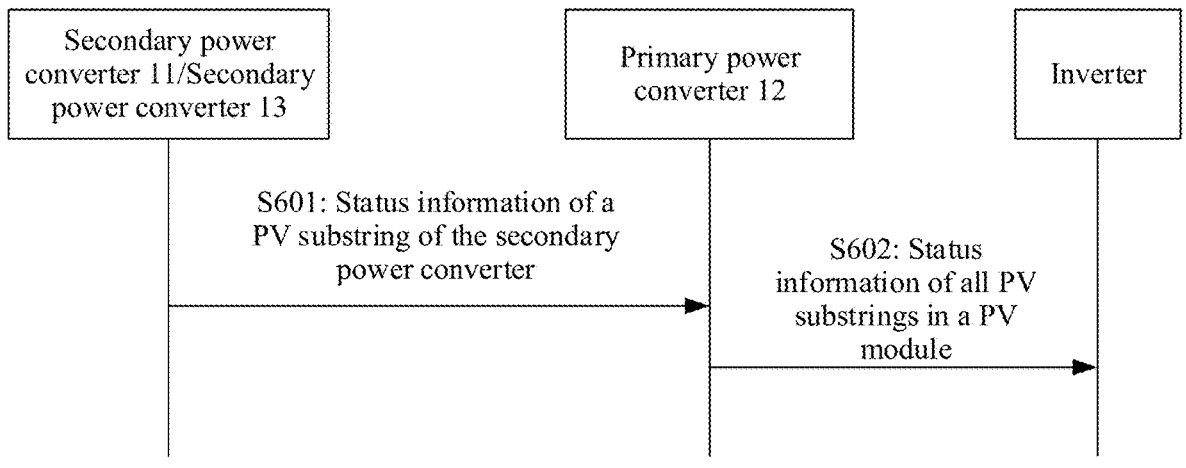
FIG. 6 is a communication flowchart of a photovoltaic system according to an embodiment of this application.

In some feasible implementations, refer to FIG. 6. FIG. 6 is a communication flowchart of a photovoltaic system according to an embodiment of this application. As shown in FIG. 6, the communication procedure of the photovoltaic system according to this embodiment of this application may include the following steps.

S601: A secondary power converter sends, to a primary power converter, status information of a photovoltaic substring corresponding to the secondary power converter.

Each secondary power converter (for example, the secondary power converter 11 or the secondary power converter 13) in the photovoltaic system collects status information of a corresponding photovoltaic substring, for example, an output current and/or an output voltage of the photovoltaic substring.

In some feasible implementations, when sending collected status information of the photovoltaic substring 2011 to the primary power converter 12, the secondary power converter 11 further sends an identity of the secondary power converter 11 to the primary power converter 12. Similarly, the secondary power converter 13 sends a collected identity of the photovoltaic substring 2012 to the primary power converter 12. The primary power converter 12 may identify, based on the identity sent by each secondary power converter, the status information of the photovoltaic substring corresponding to each secondary power converter.

Optionally, in some feasible implementations, the primary power converter 12 may receive, according to a preset rule, the status information of the photovoltaic substring sent by each secondary power converter. For example, the primary power converter 12 receives, in a query manner, the status information of the photovoltaic substring sent by each secondary power converter. For example, the primary power converter 12 records the status information of the photovoltaic substring 2011 in a first target area, and the primary power converter 12 records the status information of the photovoltaic substring 2013 in a second target area. The primary power converter 12 further records, in a third target area, the status information of the photovoltaic substring 2012 collected by the primary power converter 12. In this case, the primary power converter 12 may query a corresponding target area to identify status information of each photovoltaic substring.

S602: The primary power converter sends status information of all photovoltaic substrings in a photovoltaic module to an inverter.

The primary power converter 12 may obtain, by performing step S601, the status information of the photovoltaic substring corresponding to each secondary power converter, and the primary power converter 12 may further collect the status information of the photovoltaic substring 2012 corresponding to the primary power converter 12. In other words, the primary power converter 12 may obtain the status information of all the photovoltaic substrings in the photovoltaic module. It should be noted that the primary power converter 12 may collect the status information of the photovoltaic substring 2012 before step S601, or may collect the status information of the photovoltaic substring 2012 between step S601 and step S602. A time at which the primary power converter collects the status information of the photovoltaic substring corresponding to the primary power converter is not limited in this embodiment of this application.

Further, the primary power converter further includes an external communication module 124. The primary power converter 12 sends the status information of all the photovoltaic substrings (for example, the photovoltaic substring 2011, the photovoltaic substring 2012, and the photovoltaic substring 2013) in the photovoltaic module to the inverter through the external communication module 124. In some feasible implementations, the external communication module 124 may be a PLC communication module. For details on how the primary power converter 12 sends the status information of all the photovoltaic substrings in the photovoltaic module to the inverter through the PLC communication module, refer to an existing PLC communication manner. Details are not described herein.

In this embodiment of this application, the primary power converter may communicate with each secondary power converter. Each power converter sends, to the primary power converter, status information of a photovoltaic substring corresponding to the power converter, and then the primary power converter sends the status information of all the photovoltaic substrings of the photovoltaic module to the inverter.

Further, the inverter may generate control information based on status information of any one or more photovoltaic substrings that is sent by the primary power converter 12, and deliver the control information to the primary power converter 12. The primary power converter 12 may control, based on the control information, an output power of the photovoltaic substring 2012 corresponding to the primary power converter 12. The primary power converter 12 may further send the control information to each secondary power converter, and each secondary power converter may control, based on the control information, an output power of a photovoltaic substring corresponding to the secondary power converter.

Figure 7:
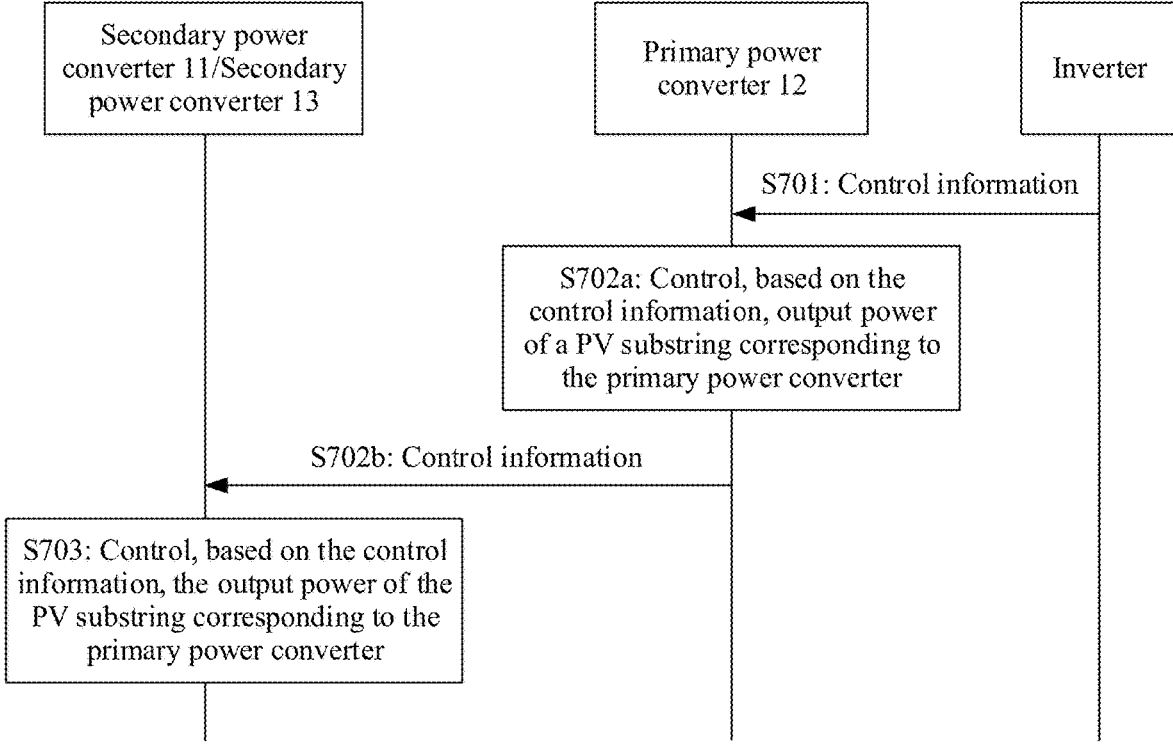
FIG. 7 is another communication flowchart of a photovoltaic system according to an embodiment of this application.

Optionally, in some feasible implementations, refer to FIG. 7. FIG. 7 is another communication flowchart of a photovoltaic system according to an embodiment of this application. As shown in FIG. 7, the communication procedure of the photovoltaic system according to this embodiment of this application may include the following steps.

S701: A primary power converter receives control information sent by an inverter.

In specific implementation, the primary power converter 12 receives, through the external communication module 124, the control information sent by the inverter.

In some feasible implementations, the inverter may receive a power station scheduling instruction from the photovoltaic system, and generate control information based on the power station scheduling instruction. For example, the control information may be a target power parameter of each photovoltaic module in the photovoltaic system. For example, an output power of each photovoltaic module is a target active power of 100 kilowatts (kW).

Optionally, in some feasible implementations, the inverter may generate control information based on status information of any one or more photovoltaic substrings in the photovoltaic module that is sent by the primary power converter 12. For example, the inverter may determine, based on an output voltage/output current value of a photovoltaic substring, whether the photovoltaic substring is faulty. For example, in a normal case, an output voltage of a photovoltaic substring is 30 volts (V). If an output voltage of a photovoltaic substring is 10 V, it indicates that the photovoltaic substring is faulty, and the inverter may generate a shutdown signal.

S702a: The primary power converter controls, based on the control information, the output power of the photovoltaic substring corresponding to the primary power converter.

For example, the primary power converter 12 may obtain, based on an identity of the primary power converter carried in the control information, the control information delivered by the inverter to the primary power converter 12; or the primary power converter 12 may obtain, from the second target area, the control information delivered by the inverter to the primary power converter 12.

In some feasible implementations, the primary power converter 12 adjusts a duty cycle of a switching transistor in the power conversion module 121 based on the foregoing control information, so as to adjust an output voltage and/or an output current of the photovoltaic substring 2012 corresponding to the primary power converter 12.

Optionally, in some feasible implementations, the primary power converter 12 provides a shutdown function. When the photovoltaic substring 2012 is faulty, the inverter generates control information (namely, a first shutdown signal). The primary power converter 12 shuts down, based on the first shutdown signal, a loop in which the photovoltaic substring 2012 outputs a direct current to the power conversion module 121, so as to avoid impact of the photovoltaic substring 2012 on the photovoltaic system.

S702*b*: The primary power converter sends the control information to each secondary power converter.

It should be noted that there is no limitation on a sequence of performing step S702*a* and step S702*b* by the primary power converter 12. Step S702*a* and step S702*b* may be performed simultaneously, step S702*a* may be performed before step S702*b*, or step S702*a* may be performed after step S702*b*.

In specific implementation, the primary power converter 12 forwards the control information received from the inverter to each secondary power converter.

In some feasible implementations, the control information carries an identity of each power converter, and each secondary power converter may obtain, based on the identity carried in the control information, the control information delivered by the inverter to the secondary power converter.

Optionally, in some feasible implementations, each secondary power converter obtains, according to a preset rule from a target area corresponding to the secondary power converter, control information delivered by the inverter to the secondary power converter. For example, the secondary power converter 11 obtains, from the first target area, control information delivered by the inverter to the secondary power converter 11, and the secondary power converter 13 obtains, from the third target area, control information delivered by the inverter to the secondary power converter 13.

S703: The secondary power converter controls, based on the control information, an output power of a photovoltaic substring corresponding to the secondary power converter.

In some feasible implementations, the secondary power converter 11 adjusts a duty cycle of a switching transistor in the power conversion module 111 based on the foregoing control information, so as to adjust an output voltage and/or an output current of the photovoltaic substring 2011 corresponding to the secondary power converter 11. Similarly, the secondary power converter 13 may also adjust a duty cycle of a switching transistor in the power conversion module 131 based on the foregoing control information, so as to adjust an output voltage and/or an output current of the photovoltaic substring 2013 corresponding to the secondary power converter 13.

Optionally, in some feasible implementations, the secondary power converter 11 and the secondary power converter 13 provide the shutdown function. When the photovoltaic substring 2011 is faulty, the inverter generates control information (namely, a second shutdown signal). The secondary power converter 11 shuts down, based on the second shutdown signal, a loop in which the photovoltaic substring 2011 outputs direct current to the power conversion module 111, so as to avoid impact of the photovoltaic substring 2011 on the photovoltaic system. Similarly, when the photovoltaic substring 2013 is faulty, the inverter generates control information (namely, a third shutdown signal). The secondary power converter 13 shuts down, based on the third shutdown signal, a loop in which the photovoltaic substring 2013 outputs direct current to the power conversion module 131, so as to avoid impact of the photovoltaic substring 2013 on the photovoltaic system.

In this embodiment of this application, the primary power converter may communicate with each secondary power converter. When the inverter delivers control information to the photovoltaic module, the primary power converter first receives the control information delivered by the inverter, and then the primary power converter sends the control information to each secondary power converter.

In conclusion, in this embodiment of this application, the primary power converter may communicate with each secondary power converter, and the primary power converter is responsible for external communication (that is, communication with the inverter). The secondary power converter neither needs to be equipped with an external communication module, nor needs to be connected to the inverter through communication cables. Only the primary power converter is to be equipped with an external communication module and connected to the inverter through communication cables. In this case, preparation costs of power converter can be reduced and cost of cables in the photovoltaic system can also be reduced.

In this embodiment of this application, a communication manner between the primary power converter and each secondary power converter may be a wireless communication manner such as ZigBee, Wi-Fi, Bluetooth, or infrared, or may be a wired communication manner such as PLC, RS485, or IIC. Further, the communication manner between the primary power converter and each secondary power converter may be a combination of a wireless communication manner and a wired communication manner. For example, the primary power converter communicates with the first secondary power converter by using Wi-Fi, and the primary power converter communicates with the second secondary power converter by using PCL.

An example in which the power converter box includes one primary power converter and two secondary power converters in this embodiment of this application is used. With reference to FIG. 8 to FIG. 12, communication manners between the primary power converter and each secondary power converter in the power converter box are described as examples, but are not exhaustive. It should be understood that in addition to communication manners recorded in this embodiment of this application, communication between the primary power converter and each secondary power converter may be implemented in another manner.

Figure 8:
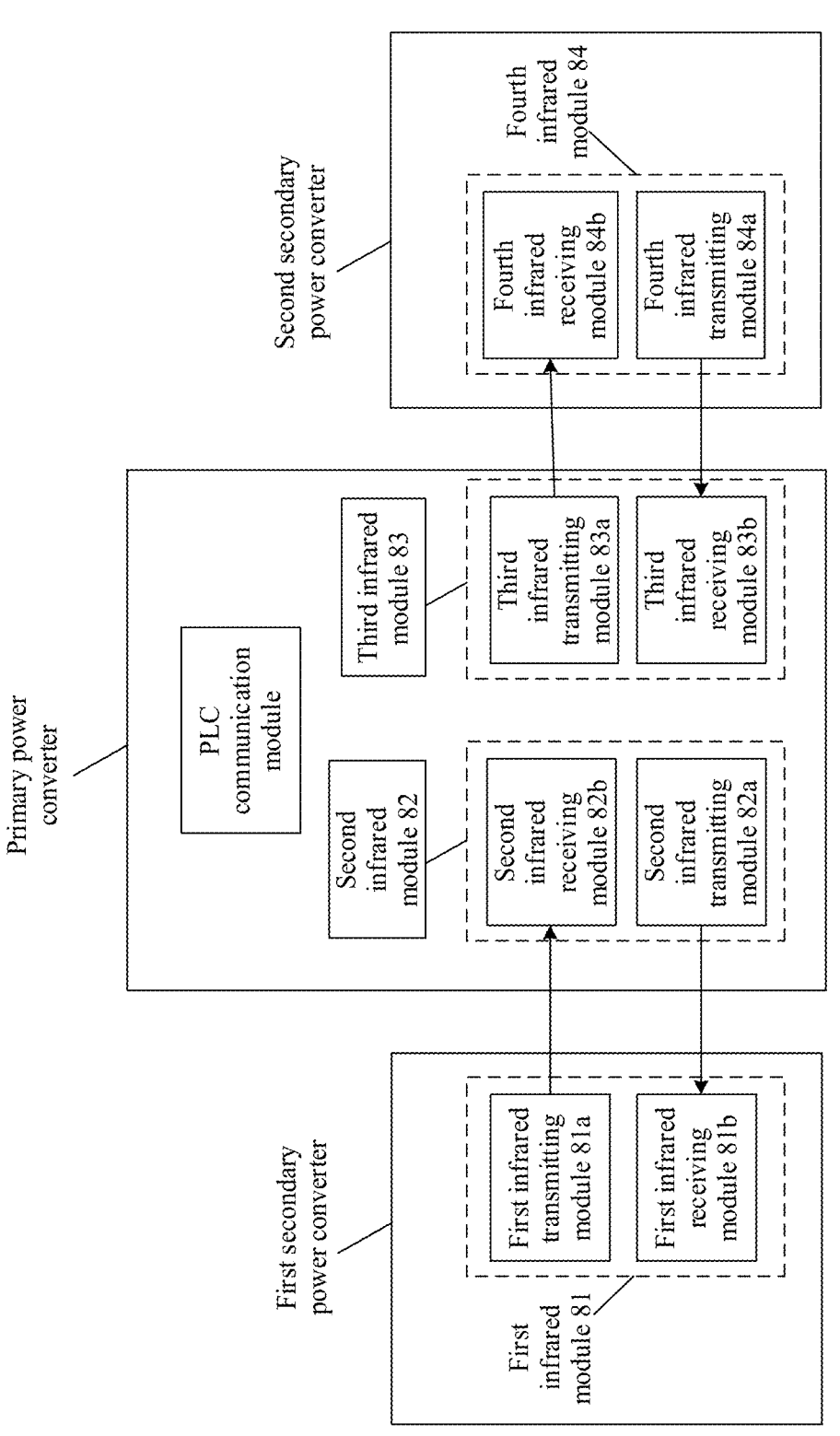
FIG. 8 is a block diagram of a communication structure of a power converter box according to an embodiment of this application.

In some feasible implementations, refer to FIG. 8. FIG. 8 is a block diagram of a communication structure of a power converter box according to an embodiment of this application. As shown in FIG. 8, each power converter includes at least one infrared module, and a primary power converter communicates with a secondary power converter by using the infrared module.

For example, a first secondary power converter includes a first infrared module 81, the primary power converter includes two infrared modules (for example, a second infrared module 82 and a third infrared module 83), and a second secondary power converter includes a fourth infrared module 84. The first infrared module 81 establishes communication with the second infrared module 82, and the third infrared module 83 establishes communication with the fourth infrared module 84.

In specific implementation, each infrared module includes an infrared transmitting module and an infrared receiving module.

The first infrared module 81 includes a first infrared transmitting module 81a and a first infrared receiving module 81b, and the second infrared module 82 includes a second infrared transmitting module 82a and a second infrared receiving module 82b. In some feasible implementations, the first secondary power converter may send, by using the first infrared transmitting module 81a, status information of a photovoltaic substring corresponding to the first secondary power converter to the second infrared receiving module 82b in the primary power converter. Optionally, the primary power converter may send, by using the second infrared transmitting module 82a to the first infrared receiving module 81b in the first secondary power converter, control information delivered by an inverter.

Similarly, the third infrared module 83 includes a third infrared transmitting module 83a and a third infrared receiving module 83b, and the fourth infrared module 84 includes a fourth infrared transmitting module 84a and a fourth infrared receiving module 84b. In some feasible implementations, the second secondary power converter sends, by using the fourth infrared transmitting module 84a, status information of a photovoltaic substring corresponding to the second secondary power converter to the third infrared receiving module 83b in the primary power converter. Optionally, the primary power converter may send, by using the third infrared transmitting module 83a to the fourth infrared receiving module 84b in the second secondary power converter, control information delivered by the inverter. For a specific implementation of communication between infrared modules, refer to the conventional technology. Details are not described herein again.

Figure 9:
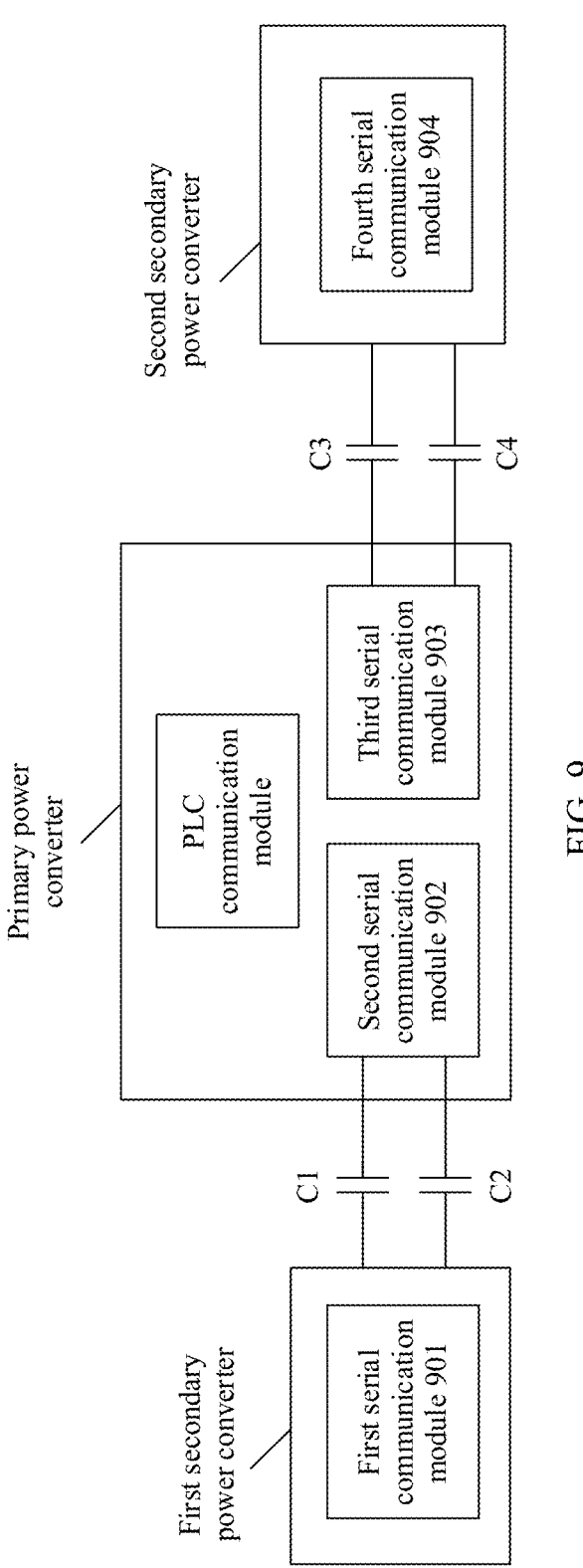
FIG. 9 is a block diagram of another communication structure of a power converter box according to an embodiment of this application.

Optionally, in some feasible implementations, refer to FIG. 9. FIG. 9 is a block diagram of still another communication structure of a power converter box according to an embodiment of this application. As shown in FIG. 9, each power converter includes at least one serial communication module. Serial communication modules of the power converters are coupled through an isolation capacitor. In this case, a primary power converter communicates with a secondary power converter by using the serial communication module.

For example, a first secondary power converter includes a first serial communication module 901, the primary power converter includes two serial communication modules (for example, a second serial communication module 902 and a third serial communication module 903), and a second secondary power converter includes a fourth serial communication module 904. The first serial communication module 901 establishes communication with the second serial communication module 902, and the third serial communication module 903 establishes communication with the fourth serial communication module 904.

In specific implementation, the first serial communication module 901 is coupled to the second serial communication module 902 through an isolation capacitor C1 and an isolation capacitor C2. It may be understood that the isolation capacitor C1 and the isolation capacitor C2 are located on different communication loops. For example, if the isolation capacitor C1 is on a communication loop where the first secondary power converter sends information to the primary power converter, the isolation capacitor C2 is on a communication loop where the primary power converter sends information to the first secondary power converter, and vice versa. The primary power converter and each secondary power converter are separately located in independent boxes, that is, the primary power converter and each secondary power converter are not located on the same reference ground. The isolation capacitors (for example, C1 and C2) are configured to enable the first secondary power converter and the primary power converter to be located on the same reference ground.

In some feasible implementations, the first secondary power converter may send, to the second serial communication module 902 in the primary power converter by using the first serial communication module 901, status information of a photovoltaic substring corresponding to the first secondary power converter. Optionally, the primary power converter may send, to the first serial communication module 901 in the first secondary power converter by using the second serial communication module 902, control information delivered by an inverter. For a specific implementation of serial communication, refer to the conventional technology. Details are not described herein again.

Similarly, the third serial communication module 903 is coupled to the fourth serial communication module 904 through an isolation capacitor C3 and an isolation capacitor C4. The isolation capacitor C3 and the isolation capacitor C4 are located on different communication loops. For example, if the isolation capacitor C3 is on a communication loop where the second secondary power converter sends information to the primary power converter, the isolation capacitor C4 is on a communication loop where the primary power converter sends information to the first secondary power converter, and vice versa. The isolation capacitors (for example, C3 and C4) are configured to enable the second secondary power converter and the primary power converter to be located on the same reference ground.

In some feasible implementations, the second secondary power converter may send, by using the fourth serial communication module 904, status information of a photovoltaic substring corresponding to the second secondary power converter to the third serial communication module 903 in the primary power converter. Optionally, the primary power converter may send, to the fourth serial communication module 904 in the second secondary power converter by using the third serial communication module 903, control information delivered by the inverter. For a specific implementation of serial communication, refer to the conventional technology. Details are not described herein again.

Figure 10:
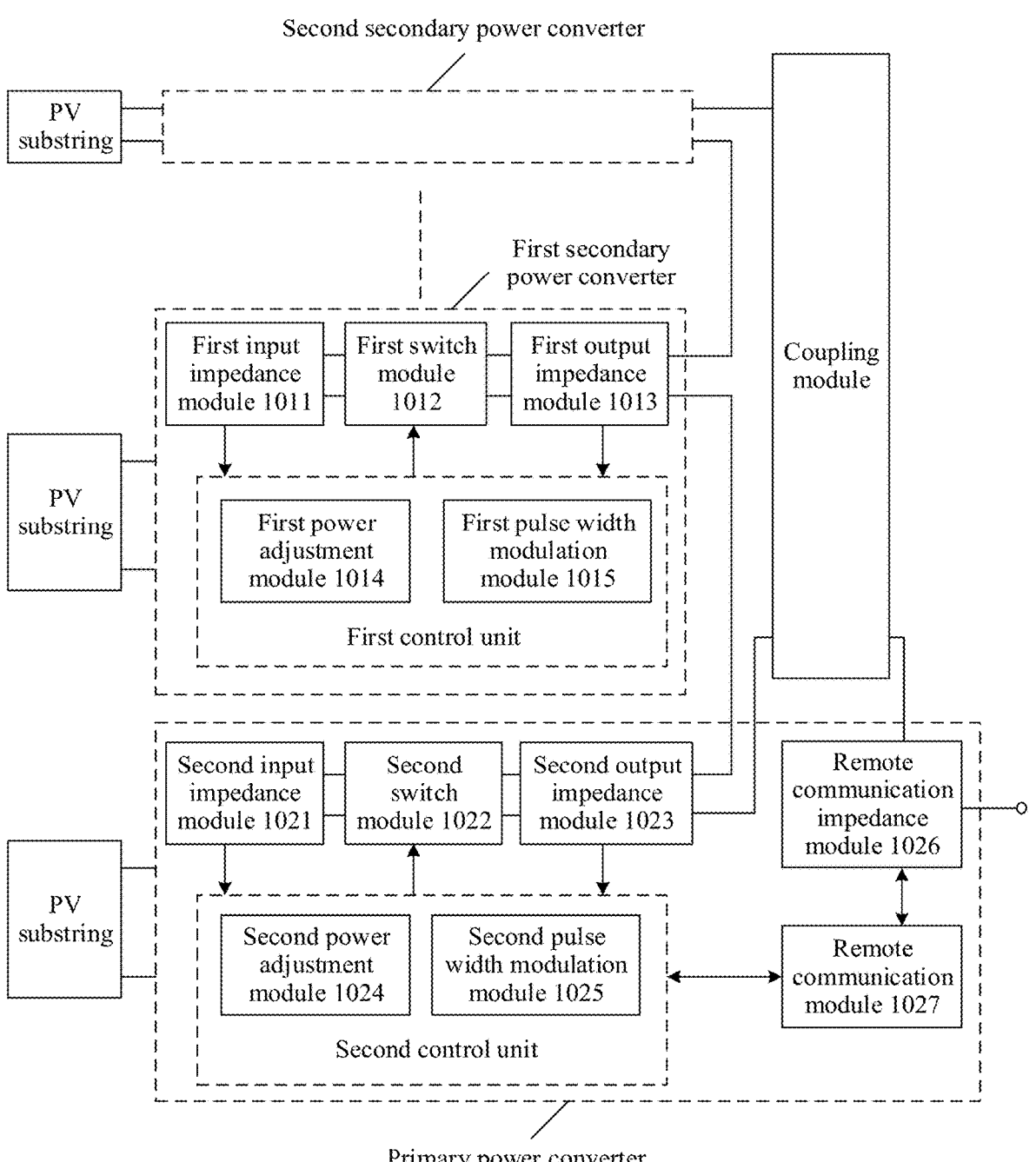
FIG. 10 is a block diagram of still another communication structure of a power converter box according to an embodiment of this application.

Optionally, in some feasible implementations, refer to FIG. 10. FIG. 10 is a block diagram of still another communication structure of a power converter box according to an embodiment of this application. As shown in FIG. 10, each power converter includes a pulse width modulation module, and a primary power converter and a secondary power converter communicate with each other by using the pulse width modulation module.

For example, a first secondary power converter includes a first pulse width modulation module 1015 and a first switch module 1012. The first secondary power converter generates, by using the first pulse width modulation module 1015, a first pulse width signal based on status information of a photovoltaic substring corresponding to the secondary power converter, and sends the first pulse width signal to the first switch module 1012, to control an output voltage of the first switch module 1012. The output voltage of the first switch module 1012 carries the status information of the photovoltaic substring corresponding to the first secondary power converter. The primary power converter collects the output voltage of the first switch module 1012 in the first secondary power converter, to obtain the status information of the photovoltaic substring corresponding to the first secondary power converter.

In specific implementation, the first secondary power converter further includes a first input impedance module 1011, a first output impedance module 1013, and a first power adjustment module 1014. The first power adjustment module 1014 and the first pulse width modulation module 1015 are modules in a first control unit. The status information of the photovoltaic substring corresponding to the first secondary power converter is sensed by the first input impedance module 1011, and is then transferred to the first control unit. The first power adjustment module 1014 in the first control unit is configured to adjust an output power of a photovoltaic substring corresponding to the first secondary power converter, so as to implement MPPT of the photovoltaic substring. It may be understood that the output voltage of the first switch module 1012 is transferred by the first output impedance module 1013 to a coupling module, and the coupling module is configured to couple output voltages of all power converters, so as to transfer information.

Figure 11:
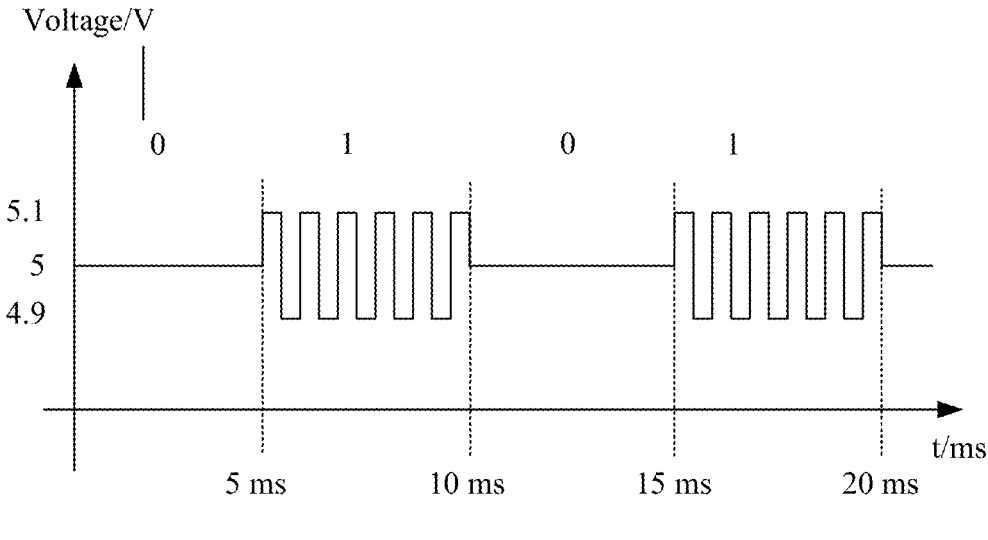
FIG. 11 is a schematic diagram of a waveform of an output end of a power converter box according to an embodiment of this application.

Further, when the secondary power converter sends the status information of the photovoltaic substring corresponding to the secondary power converter to the primary power converter, the first control unit may control, based on a preset communication frequency, the first pulse width modulation module 1015 to generate the first pulse width signal based on the status information of the photovoltaic substring. For example, when the first secondary power converter works normally, an input voltage is 10 V, a duty cycle is 50%, and an output voltage is 5 V. For example, the status information of the photovoltaic substring is an output current 5 amperes (A). The first control unit may switch between a duty cycle of 49% and a duty cycle of 51% based on a preset communication frequency, for example, 1 kilohertz (kHz). In this case, the output voltage of the first switch module 1012 switches between 4.9 V and 5.1 V, and the switching time is 1 ms. A switch triggering rule may be preset for the first control unit. For example, if the status information of the photovoltaic substring is that the output current is 5 A, the first secondary power converter transmits a binary signal "0101" to the primary power converter. If the binary signal is "1", the duty cycle is switched. Otherwise, the original duty cycle of 50% is kept. The switching time of the duty cycle is determined by a sampling frequency of a second control unit of the primary power converter. Refer to FIG. 11. FIG. 11 is a schematic diagram of a waveform of an output end of a power converter box according to an embodiment of this application. As shown in FIG. 11, that a sampling frequency of the second control unit is 200 hertz (Hz) is used as an example. When the output voltage of the first switch module 1012 collected by the primary power converter is switched between 4.9 V and 5.1 V, it is determined that the current signal is "1". If the output voltage of the first switch module 1012 collected by the primary power converter is 5 V, it is determined that the current signal is "0". In this case, the signal carried in the waveform shown in FIG. 11 is "0101", and may indicate that the output current of the photovoltaic substring corresponding to the first secondary power converter is 5 A. The first secondary power converter in the figure is used as an example to describe the secondary power converter in this embodiment of this application. It may be understood that another power converter in this embodiment of this application may also implement functions of the first secondary power converter.

For another example, the primary power converter includes a second pulse width modulation module 1025 and a second switch module 1022. The primary power converter generates, by using the second pulse width modulation module 1025, a second pulse width signal based on control information delivered by an inverter, and sends the second pulse width signal to the second switch module 1022, so as to control an output voltage of the second switch module 1022. The output voltage of the second switch module 1022 carries the control information. The first secondary power converter obtains the control information by collecting the output voltage of the second switch module 1022 in the primary power converter.

In specific implementation, the primary power converter further includes a second input impedance module 1021, a second output impedance module 1023, a second power adjustment module 1024, a remote communication impedance module 1026, and a remote communication module 1027. The second power adjustment module 1024 and the second pulse width modulation module 1025 are located in the second control unit. The second power adjustment module 1024 in the second control unit may adjust an output power of a photovoltaic substring corresponding to the primary power converter.

The second input impedance module 1021 may sense status information of the photovoltaic substring corresponding to the primary power converter, and transfer the status information to the second control unit.

Control information delivered by an inverter is first sensed by the remote communication impedance module 1026, and then the remote communication impedance module 1026 sends the control information to the remote communication module 1027 (for example, a PLC communication module). The remote communication module 1027 transfers the control information to the second control unit. The second control unit may control, based on a preset communication frequency, the second pulse width modulation module 1025 to generate a second pulse width signal based on the control information, and control an output voltage of the second switch module 1022. The output voltage of the second switch module 1022 is transferred to a coupling module through the second output impedance module 1023. A specific control process is similar to a process of the first secondary power converter described with reference to FIG. 11, and details are not described herein again. The first control unit of the first secondary power converter obtains the control information by obtaining the output voltage of the second switch module 1022 from the coupling module.

Figure 12:
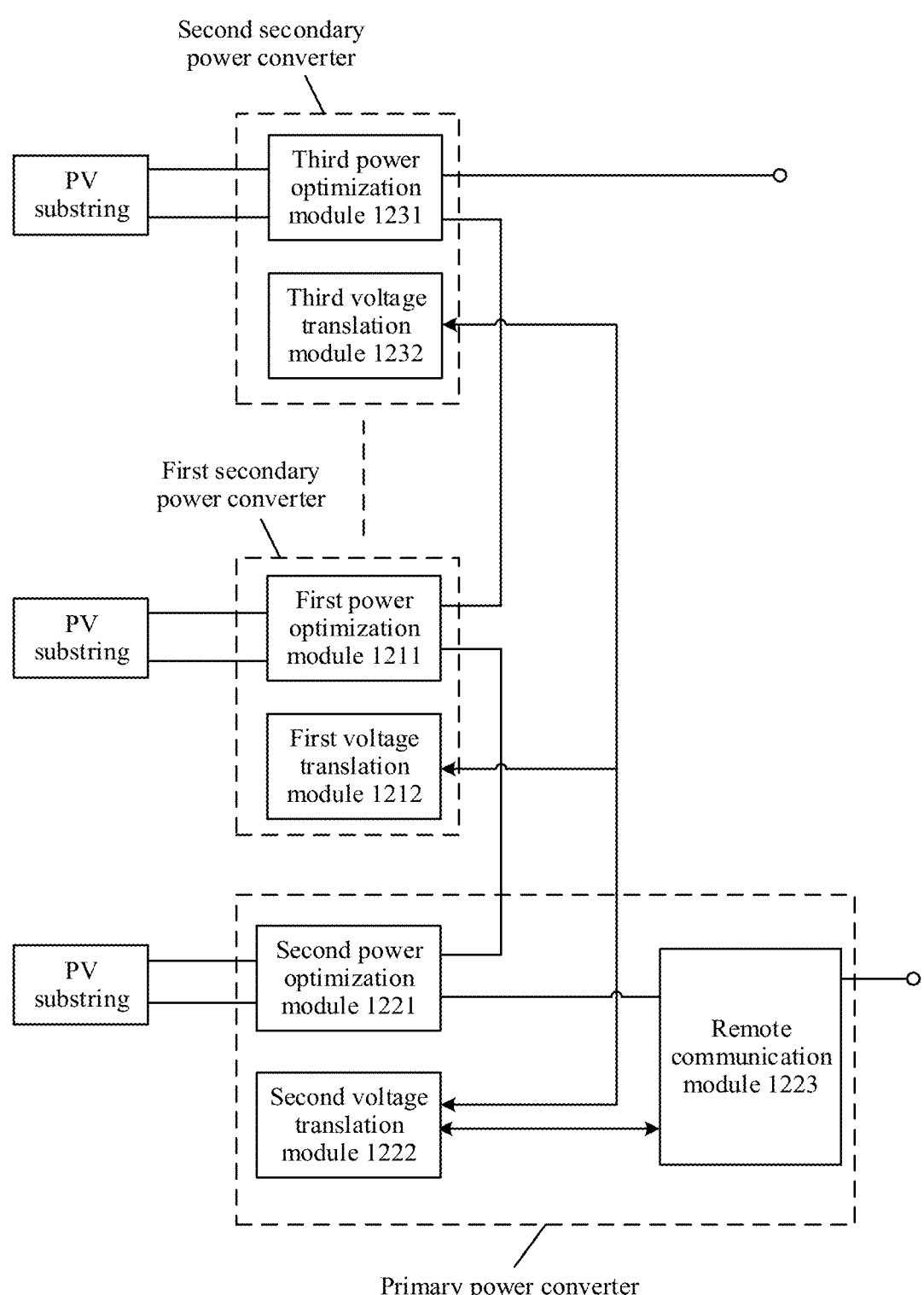
FIG. 12 is a block diagram of yet another communication structure of a power converter box according to an embodiment of this application.

Refer to FIG. 12. FIG. 12 is a block diagram of still another communication structure of a power converter box according to an embodiment of this application. As shown in FIG. 12, each power converter includes at least one voltage translation module. For example, a first secondary power converter includes a first voltage translation module 1212, a primary power converter includes a second voltage translation module 1222, and a second secondary power converter includes a third voltage translation module 1232.

For example, the voltage translation modules in the power converters may be coupled to a same communication line, that is, the first voltage translation module 1212, the second voltage translation module 1222, and the third voltage translation module 1232 are coupled to a same communication line. A voltage translation module in each power converter may boost a received analog communication signal based on a target level value. For example, if an output voltage of a photovoltaic substring corresponding to the primary power converter is 20 V, the first voltage translation module 1212 in the first secondary power converter and the third voltage translation module 1232 in the second secondary power converter respectively boost an analog communication signal of status information of a photovoltaic string corresponding to the first secondary power converter and an analog communication signal of status information of a photovoltaic substring corresponding to the second secondary power converter by 30 V, and then transmit the analog communication signals to the primary power converter. For another example, if an output voltage of a photovoltaic substring corresponding to the first secondary power converter is 20 V, the second voltage translation module 1222 in the primary power converter boosts an analog communication signal of control information delivered by an inverter by 30 V, and then sends the analog communication signal to the first secondary power converter.

Optionally, the voltage translation modules in the power converters may also be coupled to different communication lines. That is, it may be understood that voltage values boosted by the power converters are different. In other words, the primary power converter and a secondary power converter may perform analog communication by using the voltage translation module. For details about how to implement analog communication between the voltage translation modules, refer to level shift communication in the conventional technology, and details are not described herein again.

It may be understood that each power converter further includes a power conversion module. For example, the first secondary power converter includes a first power conversion module 1211, the primary power converter includes a second power conversion module 1221, and the second secondary power converter includes a third power conversion module 1231. The power conversion modules in the power converters may perform substring-level MPPT on the photovoltaic substrings corresponding to the power converters. In addition, the primary power converter further includes a remote communication module 1223 (for example, a PLC communication module), and may receive control information delivered by an inverter.

It should be noted that the terms "first" and "second" are merely intended for a purpose of description, and shall not be understood as an indication or implication of relative importance.

In this application, division into the units is merely logical function division and may be another division during actual implementation. For example, a plurality of units or components may be combined or integrated into another system, or some features may be ignored or not performed.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, the functional units in embodiments of the present disclosure may be integrated into one processing unit, or each unit may be separately used as one unit, or two or more units may be integrated into one unit. The integrated unit described above may be implemented in the form of hardware, or may be implemented in the form of hardware and software functional units.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power converter box comprising:

a primary power converter comprising:
    a power-line carrier (PLC) communication component;
    a first pair of input ends configured to couple to a first photovoltaic substring; and
    a first pair of output ends, wherein the primary power converter is configured to collect first status information of the first photovoltaic substring; and a secondary power converter coupled in series with the primary power converter, configured to couple to an inverter in a photovoltaic system, and comprising:
    a second pair of input ends configured to couple to a second photovoltaic substring; and
    a second pair of output ends, wherein the secondary power converter is configured to:
        collect second status information of the second photovoltaic substring; and
        send, to the primary power converter, the second status information and a first identifier of the second power converter; and wherein the primary power converter is further configured to:
    obtain the second status information and the first identifier of the second power converter;
    send, to the inverter using the PLC communication component, the first status information, a second identifier of the primary power converter, the second status information, and the first identifier of the secondary power converter;
    receive, using the PLC communication component and from the inverter, control information, the first identifier of the secondary power converter, and the second identifier of the primary power converter;
    control, based on the control information and the second identifier of the primary power converter, a first output power of the first photovoltaic substring; and
    send, to the secondary power converter, the control information and the first identifier of the secondary power converter, and wherein the secondary power converter is further configured to:
    receive, from the primary power converter, the control information and the first identifier of the secondary power converter; and
    control, based on the control information and the first identifier of the secondary power converter, a second output power of the second photovoltaic substring.

2. The power converter box of claim 1, wherein the primary power converter comprises a first pulse-width modulator (PWM), and wherein the secondary power converter comprises a second PWM configured to communicate with the first PWM.

3. The power converter box of claim 2, wherein the secondary power converter further comprises a first switch, wherein the secondary power converter is further configured to:

generate, based on the second status information, a first pulse-width signal using the second PWM; and send the first pulse-width signal to the first switch to control an output voltage of the first switch, wherein the output voltage of the first switch carries the second status information, and wherein the primary power converter is further configured to obtain, by collecting the output voltage of the first switch, the second status information.

4. The power converter box of claim 1, further comprising a second secondary power converter comprising a third pair of output ends, wherein each pair of output ends has a positive output end and a negative output end, wherein the positive output end of the second pair of output ends is coupled to a positive input end of the inverter, wherein the negative output end of the second pair of output ends is coupled to the positive output end of the first pair of output ends, wherein the negative output end of the first pair of output ends is coupled to the positive output end of the third pair of output ends, and wherein the negative output end of the third pair of output ends is coupled to a negative input end of the inverter.

5. A power converter box comprising:
a primary power converter comprising:
    a power-line carrier (PLC) communication component;
    a first pair of input ends configured to couple to a first photovoltaic substring; and
    a first pair of output ends, wherein the primary power converter is configured to:
        receive, from an inverter using the PLC communication component, control information, a first identifier of a secondary power converter, and a second identifier of the primary power converter;
        control, based on the control information and the second identifier of the primary power converter, a first output power of the first photovoltaic substring; and
        send, to the secondary power converter, the control information and the first identifier of the secondary power converter; and
the secondary power converter coupled in series with the primary power converter, configured to couple to the inverter, and configured to:
    receive, from the primary power converter, the control information and the first identifier of the secondary power converter; and
    control, based on the control information and the first identifier of the secondary power converter, a second output power of a second photovoltaic substring corresponding to the secondary power converter.

6. A photovoltaic system, comprising:
a photovoltaic component;
a first photovoltaic substring located in the photovoltaic component;
a second photovoltaic substring located in the photovoltaic component;
an inverter; and
a power converter box comprising:
    a primary power converter comprising:
        a power-line carrier (PLC) communication component;
        a first pair of input ends configured to couple to the first photovoltaic substring; and
        a first pair of output ends, wherein the primary power converter is configured to collect first status information of the first photovoltaic substring;
    a secondary power converter coupled in series with the primary power converter, configured to couple to the inverter, and comprising:
        a second pair of input ends configured to couple to the second photovoltaic substring; and
        a second pair of output ends, wherein the secondary power converter is configured to:

collect second status information of the second photovoltaic substring, and
send, to the primary power converter, the second status information and a first identifier of the second power converter; and
wherein the primary power converter is further configured to:
    obtain the second status information and the first identifier of the second power converter;
    send, to the inverter using the PLC communication component, the first status information, a second identifier of the primary power converter, the second status information, and the first identifier of the secondary power converter;
    receive, using the PLC communication component and from the inverter, control information, the first identifier of the secondary power converter, and the second identifier of the primary power converter;
    control, based on the control information and the second identifier of the primary power converter, a first output power of the first photovoltaic substring; and
    send, to the secondary power converter, the control information and the first identifier of the secondary power converter, and
wherein the secondary power converter is further configured to:
    receive, from the primary power converter, the control information and the first identifier of the secondary power converter; and
    control, based on the control information and the first identifier of the secondary power converter, a second output power of the second photovoltaic substring.

7. The photovoltaic system of claim 6, wherein the primary power converter comprises a first pulse-width modulator (PWM), and wherein the secondary power converter comprises a second PWM configured to communicate with the first PWM.

8. The photovoltaic system of claim 7, wherein the secondary power converter further comprises a first switch, wherein the secondary power converter is configured to:
    generate, based on the second status information, a first pulse-width signal using the second PWM; and
    send the first pulse-width signal to the first switch to control an output voltage of the first switch, wherein the output voltage of the first switch carries the second status information, and
wherein the primary power converter is configured to obtain, by collecting the output voltage of the first switch, the second status information.

9. The photovoltaic system of claim 6, wherein the first photovoltaic substring and the second photovoltaic substring each comprise two parallel substring units having parallel connection points, and wherein the parallel connection points between the two parallel substring units are output ends of a photovoltaic substring in which the two parallel substring units are located.

10. The photovoltaic system of claim 6, further comprising a second secondary power converter comprising a third pair of output ends, wherein each pair of output ends has a positive output end and a negative output end, wherein the positive output end of the second pair of output ends is coupled to a positive input end of the inverter, wherein the negative output end of the second pair of output ends is coupled to the positive output end of the first pair of output ends, wherein the negative output end of the first pair of output ends is coupled to the positive output end of the third pair of output ends, and wherein the negative output end of the third pair of output ends is coupled to a negative input end of the inverter.

11. The power converter box of claim 5, further comprising a second secondary power converter comprising a third pair of output ends, wherein the secondary power converter further comprises a second pair of output ends, wherein each pair of output ends has a positive output end and a negative output end, wherein the positive output end of the second pair of output ends is coupled to a positive input end of the inverter, wherein the negative output end of the second pair of output ends is coupled to the positive output end of the first pair of output ends, wherein the negative output end of the first pair of output ends is coupled to the positive output end of the third pair of output ends, and wherein the negative output end of the third pair of output ends is coupled to a negative input end of the inverter.

12. The power converter box of claim 1, wherein the primary power converter is configured to control the first output power of the first photovoltaic substring by adjusting a first duty cycle of a first switching transistor of the primary power converter, and wherein the secondary power converter is configured to control the second output power of the second photovoltaic substring by adjusting a second duty cycle of a second switching transistor of the secondary power converter.

13. The power converter box of claim 1, wherein the control information further comprises a first shutdown signal and a second shutdown signal, wherein the primary power converter is further configured to shut down, based on the first shutdown signal, the first photovoltaic substring, and wherein the secondary power converter is further configured to shut down, based on the second shutdown signal, the second photovoltaic substring.

14. The power converter box of claim 1, wherein the secondary power converter comprises a plurality of secondary power converters, and wherein the first identifier of the secondary power converter comprises a plurality of first identifiers corresponding to the plurality of secondary power converters.

15. The power converter box of claim 5, wherein the primary power converter is configured to control the first output power of the first photovoltaic substring by adjusting a first duty cycle of a first switching transistor of the primary power converter, and wherein the secondary power converter is configured to control the second output power of the second photovoltaic substring by adjusting a second duty cycle of a second switching transistor of the secondary power converter.

16. The power converter box of claim 5, wherein the control information further comprises a first shutdown signal and a second shutdown signal, wherein the primary power converter is further configured to shut down, based on the first shutdown signal, the first photovoltaic substring, and wherein the secondary power converter is further configured to shut down, based on the second shutdown signal, the second photovoltaic substring.

17. The power converter box of claim 5, wherein the secondary power converter comprises a plurality of secondary power converters, and wherein the first identifier of the secondary power converter comprises a plurality of first identifiers corresponding to the plurality of secondary power converters.

18. The photovoltaic system of claim 6, wherein the primary power converter is configured to control the first output power of the first photovoltaic substring by adjusting a first duty cycle of a first switching transistor of the primary power converter, and wherein the secondary power converter is configured to control the second output power of the second photovoltaic substring by adjusting a second duty cycle of a second switching transistor of the secondary power converter.

19. The photovoltaic system of claim 6, wherein the control information further comprises a first shutdown signal and a second shutdown signal, wherein the primary power converter is further configured to shut down, based on the first shutdown signal, the first photovoltaic substring, and wherein the secondary power converter is further configured to shut down, based on the second shutdown signal, the second photovoltaic substring.

20. The photovoltaic system of claim 6, wherein the secondary power converter comprises a plurality of secondary power converters, and wherein the first identifier of the secondary power converter comprises a plurality of first identifiers corresponding to the plurality of secondary power converters.

* * * * *